United States Patent [19]
Harnden, Jr

[11] 3,786,220
[45] Jan. 15, 1974

[54] INDUCTION COOKING APPLIANCE INCLUDING TEMPERATURE SENSING OF INDUCTIVELY HEATED COOKING VESSEL

[75] Inventor: John D. Harnden, Jr, Schenectady, N.Y.

[73] Assignee: General Electric Company, Schenectady, N.Y.

[22] Filed: Dec. 29, 1971

[21] Appl. No.: 213,350

[52] U.S. Cl............ 219/10.49, 219/10.75, 219/450
[51] Int. Cl. ............................................. H05b 5/04
[58] Field of Search...................... 219/10.49, 10.77, 219/10.79, 450, 449, 516, 456; 338/22, 23; 73/362 AR

[56] References Cited
UNITED STATES PATENTS

| | | | |
|---|---|---|---|
| 3,710,062 | 1/1973 | Petent............................. | 219/10.49 |
| 3,256,417 | 6/1966 | Merrett........................... | 219/10.79 |
| 3,530,499 | 9/1970 | Schroeder....................... | 219/10.49 |
| 3,221,284 | 11/1965 | Summerea....................... | 219/450 |
| 1,739,617 | 12/1929 | Shaw............................... | 219/10.49 |
| 3,624,352 | 11/1971 | Deaton........................... | 219/494 |
| 3,191,003 | 6/1965 | Yohe ............................... | 219/450 |

FOREIGN PATENTS OR APPLICATIONS

| | | | |
|---|---|---|---|
| 1,231,827 | 1/1967 | Germany........................... | 219/450 |
| 1,157,711 | 7/1969 | Great Britain................... | 219/10.49 |
| 1,565,823 | 2/1970 | Germany........................... | 219/450 |

OTHER PUBLICATIONS

Mapham, "Low Cost, Ultrasonic Frequency Inverter," Application Note 200.49, Feb. 1967, General Electric Semiconductor Products Dept.

*Primary Examiner*—Bruce A. Reynolds
*Attorney*—Patrick D. Ward, Joseph T. Cohen & Jerome C. Squillaro

[57] ABSTRACT

Disclosed herein is an induction range having a counter including a top surface on which a cooking vessel is rested. A temperature sensing unit is located in an opening in the counter. The temperature sensing unit includes a low-restoring-force spring diaphragm which supports a thermistor unit. The temperature sensing unit forms a closure for the opening in the counter such that the temperature sensing unit together with the top surface of the counter provides an uninterrupted work surface which may be easily cleaned. Because energization of an induction coil positioned near the counter induces high frequency heating currents in the vessel only, and because the temperature sensing unit and induction coil are located relative to each other so that the temperature sensing unit is in a region of relatively low magnetic field intensity, the counter and the temperature sensing unit are not directly heated by the action of the induction coil. Hence, materials not employable in prior art conventional electric and gas ranges may now be employed for the counter and temperature sensing unit. Since the spring diaphragm has a low restoring force it is easily compressed by the cooking vessel, enabling the thermistor unit, or temperature sensor, to make positive contact with the vessel in order to sense its temperature. Also, being of a thin elastic material, the spring diaphragm easily contours itself to the irregular surface of cooking vessels. Permanent magnet means may be combined with the diaphragm in order to achieve a more positive coupling with magnetically permeable cooking vessels.

2 Claims, 9 Drawing Figures

PATENTED JAN 15 1974

PATENTED JAN 15 1974 3,786,220

INDUCTION COOKING APPLIANCE INCLUDING TEMPERATURE SENSING OF INDUCTIVELY HEATED COOKING VESSEL

CROSS REFERENCES TO RELATED APPLICATIONS

A fuller appreciation of induction cooking appliances as well as of some of the sophistications which may be embodied therein is to be had by referring to the following U.S. Pat. applications: Ser. No. 200,526, filed Nov. 19, 1971, in behalf of David L. Bowers, et al, titled SOLID STATE INDUCTION COOKING APPLIANCE; U.S. Pat. Ser. No. 200,424, filed Nov. 19, 1971, in behalf of J.D. Harnden, Jr. et al., titled SOLID STATE INDUCTION COOKING APPLIANCES AND CIRCUITS. The entire right, title and interest in and to the inventions described in the aforesaid patent applications, as well as in and to the aforesaid applications, and the entire right, title and interest in and to the invention herein described, as well as in and to the patent application of which this specification is a part, are assigned to the same assignee.

BACKGROUND OF THE INVENTION

This invention pertains to induction cooking, generally; and, in particular, to an induction cooking appliance including cooking vessel supporting means having combined therewith a temperature sensing unit for sensing, or detecting, the true temperature of a cooking vessel, or utensil, supported by said supporting means.

Prior art electric ranges (i.e., those employing resistance heater surface elements) and gas ranges present many problems in respect to sensing or detecting the true temperature of the cooking vessel, or utensil, resting on the range counter. The following problems are among those presented:

First, in prior art electric and gas ranges the temperature sensor and its associated components are directly heated (spuriously) in some measure by a high temperature heating source. In the conventional electric range, for example, a temperature sensing unit is situated at the center of a spiral resistance heating coil. The heating coil and the temperature sensing unit are both located on the top surface of the range counter and a cooking vessel rests on and contacts the heating coil as well as the temperature sensing unit. Although the temperature sensing unit directly contacts the heated cooking vessel, it is also subjected to direct heating by the range's resistance heating coil; e.g., by radiation and convection. In addition, the temperature of the sensing unit is influenced by, among other things, the metallic counter top of the electric range, on which it is mounted. In like manner, in a gas range the flames directly heat the temperature sensing unit and the heated metallic gridirons as well as the metallic counter top thermally influence the temperature sensing unit. Suffice it to say that: with prior art electric and gas ranges the primary heating source spuriously heats the temperature sensing unit and that other heated parts of the range also thermally perturb the temperature sensing unit.

Second, in prior art electric and gas ranges, various component parts of the temperature sensing unit have to be fabricated with materials which are capable of withstanding relatively high temperatures; e.g., 1,400° to 1,600° F, approximately. Moreover, certain materials cannot be used at all; e.g., permanent magnet materials. Again, in the conventional electric range wherein the temperature sensing unit is located at the center of a spiral resistance heater coil, which is mounted on the metallic counter top of the range, the temperature sensing unit and its associated components are subjected to maximum temperatures of approximately 1,400° to 1,600° F and significant thermal stresses are induced in the temperature sensor and its associated components as well as in the counter. Clearly, epoxy, plastic and polymide materials, among others, are not applicable for use; nor are permanent magnet materials. Similarly, high temperatures and consequent thermal stresses of like magnitude are present in gas ranges and many materials, including those hereinbefore set forth, are not applicable for use. Suffice it to say that; because of the relatively high temperatures involved in electric and gas ranges, the materials from which temperature sensors and their associated components may be fabricated are quite restricted.

Third, in prior art electric and gas ranges, the temperature sensing unit and its associated components are often required to have some thermal shielding, or insulation, to minimize the influences of spurious heating thereof by the high temperature heating source as well as by the metallic range counter and, perhaps, by the gridirons. Without some effective thermal shielding, or insulation, the temperature sensing unit will provide a completely false temperature indication unless temperature compensation is appropriately applied, which is not feasible over the wide range of cooking conditions. Moreover, without effective thermal shielding severe thermal stresses induced in the various components of the temperature sensing unit will cause a disabling, or destruction, of the temperature sensing unit. Suffice it to say that: because of the relatively high temperatures involved in electric and gas ranges the temperature sensing units employed therein require effective thermal shielding, or insulation.

Fourth, prior art temperature sensing units, especially those employed in the conventional electric range, are rather sophisticated, mechanically, and are of a somewhat complex structure and arrangement. The high temperature environment within which the temperature sensing unit is located permits severe thermal stresses to occur in various components of the temperature sensing unit and these stresses tend to promote warping of the various components. For example, because of the aforesaid severe thermal stresses a relatively massive double spring arrangement is employed in combination wih a temperature responsive device. The temperature responsive device, acting against spring restraints, contacts the bottom surface of a cooking vessel which rests, or is seated, on a flat spiral heating coil, and on the temperature responsive device, disposed on the top surface of the range counter. The massive double spring arrangement is rather stiff (i.e., the spring has a relatively high restoring force or a relatively large effective spring constant) due in large part to the need to make the arrangement structurally resistant to serious thermal deformation. Such a stiff spring arrangement generally functions satisfactorily to forcefully maintain the temperature sensing unit in contact with the more or less regular flat bottom surface of a relatively heavy vessel, such as a cast iron pot containing foodstuff to be cooked. Being in contact with the bottom surface of the vessel, or pot, it was conceptually possible for the temperature sensing unit to detect the temperature of the vessel. However, in the event that a relatively light pot or vessel is used, or if a vessel having a very irregularly contoured bottom surface was used, such prior art temperature sensing units employing the aforesaid stiff spring arrangement proved unsatisfactory. For example, if a cooking vessel is used which is not sufficiently heavy there will be insufficient vessel weight to adequately compress the spring arrangement of the temperature sensing unit and one consequence will be that the vessel will not rest on the resistance heating coil in the most intimate contact possible therewith; i.e., the vessel will be raised, or tilted, and thereby allow very inefficient heat transfer between the heating coil and the vessel. Suffice it to say that: because of the relatively high temperatures involved and because of the consequent severe thermal stresses created with such prior art ranges as have been hereinbefore described it is not practical to provide temperature sensing units having simple spring arrangements with relatively low effective spring constants, i.e., little stiffness or small restoring force.

SUMMARY OF THE INVENTION

Although the invention is hereinafter described and illustrated in the accompanying drawing figures as being embodied in an induction stove or range, it is, nevertheless, to be understood that the invention's applicability is not limited to induction cooking ranges but may be embodied in, for example, trivet warmers, portable counter top warming or cooking appliances as well as other apparatus which need not necessarily be used for cooking food.

One object of the invention herein set forth is the provision of a cooking appliance having a temperature sensing unit including a temperature sensor and associated components or elements which are free from spurious heating and the disadvantages of such heating.

Another object of the invention herein set forth is the provision of a cooking appliance, such as a range, having a temperature sensing unit including a temperature sensor and associated components or elements which may be fabricated from materials which are unusable in the relatively high temperature environments created in prior art electric and gas ranges.

Another object of the invention herein set forth is the provision of a cooking appliance, such as a range, having a temperature sensing unit including a temperature sensor and associated components or elements which need not be thermally shielded or insulated in the ways, or to the extent employed, in prior art electric or gas ranges.

Another object of the invention herein set forth is the provision of a cooking appliance having a temperature sensing unit including, in addition to a temperature sensor, components or elements associated with the sensor which provide a relatively small spring force (i.e., a relatively low restoring force or effective spring constant) for moving the sensor so as to contact the surface of a cooking vessel, which cooking vessel may be of relatively light weight and which, in addition, may have a rather irregularly contoured surface presented for contact with the temperature sensor. The invention, illustratively embodied as hereinafter described, attains the aforementioned objects as well as others in that there is provided an induction cooking appliance, for heating a vessel which is at least in part susceptible of having heating current induced therein, comprising: support means which is not susceptible of having a substantial amount of heating current induced therein and which is adapted for supporting said vessel, said support means having a surface on which said vessel is supportable and an opening therein communicating with said surface thereof; an induction coil proximate said support means and energizable for generating a changing magnetic field within which said support means and vessel supported thereby are located whereby currents are induced in said vessel thereby heating said vessel; an electric power source; a power conversion circuit coupled with said power source and said induction coil for converting the power of said source to electric power of at least ultrasonic frequency and energizing said coil with said electric power of at least ultrasonic frequency; and, a temperature sensing unit located in said opening in said support means and closing same, said temperature sensing unit comprising at least one temperature sensor and spring means supporting said sensor, said spring means exerting a relatively low restoring force in response to compression of said means by said vessel when said vessel is supported by said support means whereby said sensor is placed in close proximity to said vessel for sensing the temperature of said vessel.

One feature of the invention resides in the provision of a temperature sensing unit comprising a temperature sensor (e.g., at least one thermistor unit) and a relatively thin diaphragm of an elastomer, such as silicon rubber. In accordance with one illustrative embodiment of the invention the temperature sensor is partially embedded in a silicone rubber diaphragm so that a surface portion of the temperature sensor is exposed and is more or less flush with a relatively smooth surface of the diaphragm. The diaphragm is preformed or preset during its fabrication so that it has opposing major surfaces which are relatively smooth and are somewhat concave and convex; the partially embedded temperature sensor having its exposed surface portion appearing on the convex surface of the diaphragm. The diaphragm containing the partially embedded and partially exposed temperature sensor is positioned in the opening in a range counter, or vessel supporting means, such that the diaphragm forms a closure for the opening and, advantageously, presents an uninterrupted top surface or working surface, which is easily cleaned, on the range counter. The cooking vessel to be heated is rested on the work surface of the vessel supporting means, or range counter, more or less directly over the diaphragm and its embedded temperature sensor whereupon the convex surface presented by the diaphragm flattens easily and the sensor directly contacts the surface of the cooking vessel. Even a relatively light weight vessel will tend to flatten the elastic diaphragm because of the relatively small restoring or restraining force exerted by said diaphragm. Moreover, since the diaphragm exerts such a small restoring force and since it is also relatively thin and elastic, it is especially beneficial in that it easily conforms or contours itself to an irregularly contoured vessel surface thereby permitting the sensor to make positive contact with the vessel for the purpose of sensing the true temperature thereof.

As a modification of the foregoing embodiment, the temperature sensor may be completely embedded in the diaphragm such that the portion of the temperature sensor which is most proximate to the vessel is covered by only a thin layer of the diaphragm material; e.g., silicone rubber.

Another feature of the invention resides in employing a diaphragm of elastomeric permanent magnet material, such as silicone rubber permanent magnet material. Beneficially, the diaphragm also contains the temperature sensor which, as hereinbefore described, may be wholly or partially embedded in the diaphragm. Also, the electomeric permanent magnet diaphragm is preformed or set so as to provide opposing concave and convex surfaces in order that the diaphragm may be appropriately conformed or contoured with respect to the surface of the cooking vessel in the manner hereinbefore described. In the event that the cooking vessel is of magnetically permeable material, the elastic permanent magnet diaphragm will make positive contact with the vessel and in effect hold on to the vessel by magnetic force. Thus, a good temperature coupling between the temperature sensor and the bottom surface of the vessel will result.

As a modification of the foregoing, there is provided separate permanent magnet means in combination with an ordinary elastomeric diaphragm which, as hereinbefore described, contains a temperature sensor which may be wholly or partially embedded in the elastomer. As hereinbefore set forth, the elastomeric diaphragm is provided with opposing concave and convex surfaces for the purpose of providing an elastic, compliant spring means having a relatively low restoring force. The permanent magnet means may be bonded or otherwise suitably attached to the concave surface of the diaphragm. Again, in the event that the cooking vessel is of magnetically permeable material the permanent magnet means attached to the diaphragm will allow a positive magnetic force contact with the vessel. Thus, a positive temperature coupling between the temperature sensor and the bottom surface of the cooking vessel will be achieved.

Another feature of the invention relates to the employment of materials which are unusable with prior art electric and gas ranges because of the high temperatures involved. For example, the temperature sensing unit and the induction range counter herein described are not subjected to temperatures very much higher than 550° F. Hence, in practicing the subject invention such materials as the following, among others, may be used: silicone rubber, Teflon, Kel F, silicon rubber permanent magnet material, permanent magnets, epoxies, plastics, polymides, etc. Suffice it to say that: in general, the materials which can be used are those which can withstand approximately 550° F without deleterious effects and which are otherwise suitable from a practical viewpoint.

Another feature of the invention resides in locating the temperature sensing unit relative to the appliance's, or range's induction coil. In accordance with one embodiment of the invention there is provided an induction range having an induction coil which may be a flat air core induction coil situated beneath the range counter with the air core of the coil being in line with the opening in the range counter. Advantageously, by locating the temperature sensing unit including the sensor and the conductors extending from said sensor in the counter opening, the temperature sensing unit as well as its components are in a location of relatively low magnetic field intensity; i.e., the magnetic field created by the induction coil is at a relatively low intensity in the region of the induction coil's core as well as on an axis centrally therethrough where the temperature sensing unit is located. Thus, by virtue of the materials used and by virtue of the location in a low intensity magnetic field only insignificant heating currents will be induced in the temperature sensing unit's component parts. Moreover, the electrically conductive leads, or conductors, associated with the temperature sensor are intertwined so that such heating currents as are induced therein are effectively cancelled.

Other objects and features as well as a fuller understanding of the invention will appear by referring to the following detailed description, claims and drawings.

DESCRIPTION OF THE DRAWING FIGURES

DESCRIPTION OF PREFERRED EMBODIMENTS

Figure 1:
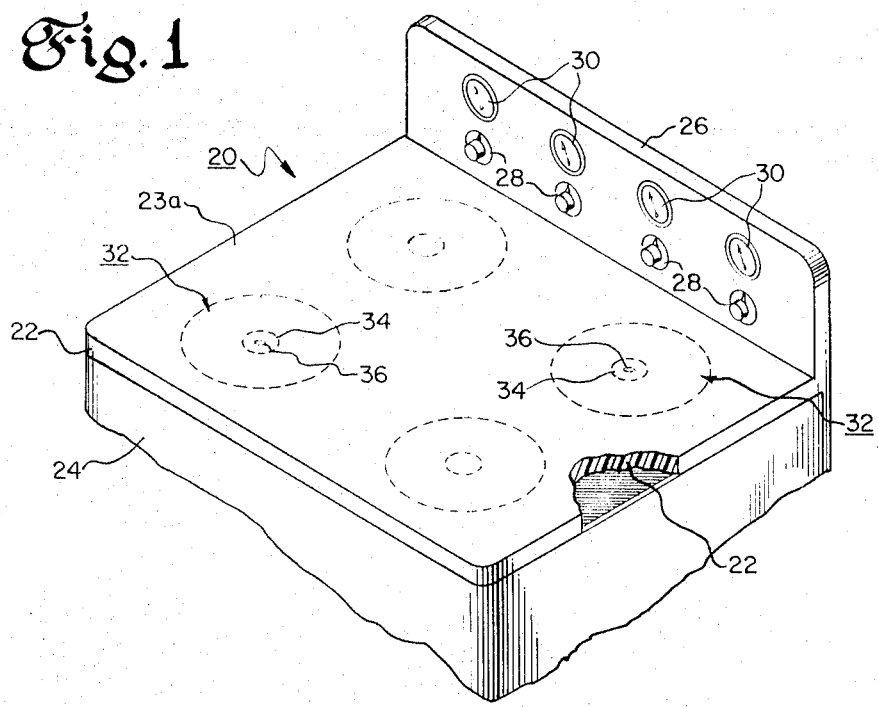
FIG. 1 is a perspective view of an upper part of an induction cooking range showing, among other things, the range counter and the working surface thereof in which there is included temperature sensing units.

Shown in FIG. 1 is an induction cooking range designated, generally, by the reference number 20. As shown, range 20 is provided with a counter 22, or vessel supporting means. The counter 22 is suitably supported on a range substructure 24. Fastened to the substructure 24 and located at the rear of counter 22 is a panel 26 on which there is mounted a number of control knobs 28 — 28 and a like number of thermometers 30 — 30. On the top or working surface of the counter 22 there is illustrated four dotted line circles. These dotted line circles are intended to suggest locations where four cooking vessels (e.g., pots, pans, etc.) may be positioned for cooking. In the counter 22, at the center of each of the dotted line circles, there is located a temperature sensing unit, designated generally by the reference number 32. The temperature sensing unit is comprised of a diaphragm 34 and a temperature sensor 36. As indicated in FIG. 1, for each cooking vessel location, indicated by a dotted circle, there is an associated temperature sensing unit 32 as well as a control knob 28 and thermometer 30.

Figure 2:
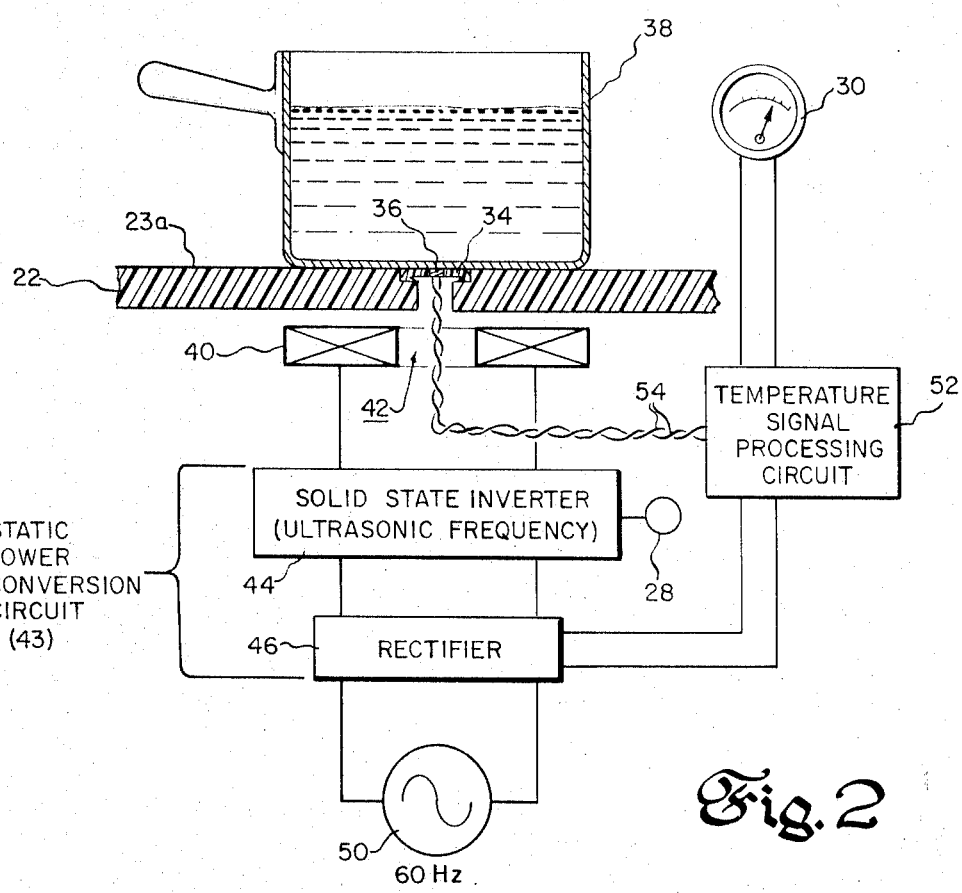
FIG. 2 is, in part, a block diagram of part of the induction cooking range of FIG. 1 showing, among other things, a cross section of a cooking vessel resting on the range counter as well as on the temperature sensing unit therein; an induction coil being located beneath the range counter.

In FIG. 2 one cooking vessel 38 is illustrated as being positioned on one of the cooking locations on the top or working surface 23a of the counter 22. Located beneath the counter 22 and separated therefrom by an air gap is a flat spiral induction coil 40. The induction coil 40 includes, at the center thereof, an air core generally designated by the reference number 42. As illustrated in FIG. 2, the coil 40 is electrically coupled to the output of a solid state inverter 44 which, in turn, has an input which is electrically coupled to the output of a rectifier 46. The solid state inverter 44 as combined with the rectifier 46 forms a static power conversion circuit designated, generally, by the reference number 43. The rectifier 46 includes an input which is electrically coupled to a conventional A.C. source 50; a 60 Hz, single phase, 110 or 220 volt source. More specific details of the static power conversion circuit 43 including the rectifier 46 and the inverter 44 may be had by referring to the patent applications hereinbefore noted under the heading CROSS REFERENCES TO RELATED APPLICATIONS.

Also shown in FIG. 2 is the control switch, or knob, 28 which is electrically coupled with the inverter 44 for the purpose of controlling the flow of power to the coil 40. Briefly, control 28 is preferably marked in °F settings to enable the housewife, for example, to demand a certain temperature, or temperature range, performance. However, it is the thermometer 30, associated with the particular control 28, which provides her with a visible feedback of the actual temperature of the vessel 38, as well as of the range of temperature rise and fall thereof. Suffice it to say that: the rectifier 46 may be a regulated full-wave rectifier employing solid state devices and functioning to convert an A.C. input to a D.C. output and the inverter 44 employs SCR's which, in performance of their control switching function, enable the inverter 44 to deliver a relatively high frequency (i.e., ultrasonic or above) output to drive induction coil 40; the controls 28 and thermometers 30 providing the actuation and feedback functions hereinbefore described.

Also shown in FIG. 2 is a temperature signal processing circuit 52 which includes: a first input coupled to rectifier 46 and deriving therefrom a source of D.C. voltage; a second input in the form of a pair of twisted electrical conductors 54 extending from temperature sensor 36 to the temperature signal processing circuit 52; and, an output coupled to the thermometer 30. Thermometer 30 may, as indicated, be a dial type electrical thermometer, suitably graduated for the aforementioned purposes. The temperature sensor 36 may be a thermistor unit and, as is well known, its electrical resistance is some known function of temperature; the resistance-temperature relationship depending on the particular thermistor selected. The thermistor unit used for sensor 36 is a thermistor material (i.e., a semiconductor material) which is encapsulated in glass frit. The thermistor material, which is temperature responsive, should preferably have a resistance range of from 1–10 Kilo ohms. Operationally, the change in the thermistor's electrical resistance in response to temperature change produces a corresponding change of impedance in the processing circuit 52 and there is developed a signal at the output of circuit 52 which corresponds to a new or changed temperature. The signal is delivered from the output of the circuit 52 to the dial type thermometer 30 which, in turn, gives a visible indication of temperature.

In FIG. 2 the vessel 38 is illustrated as being filled with a liquified food or slurry which is to be heated. The vessel 38 is a conventional pot which may be made of cast iron, magnetic stainless steel, etc.; i.e., an electrically conductive metal or alloy in which significant electrical heating current may be induced by action of the changing magnetic field produced by the coil 40. Because induction heating is employed, the vessel 38 and the counter 22 are not heated to a temperature much higher than about 550° F; the temperature of 550° F including some margin for safety. Hence, the counter 22 may be fabricated from materials which are not usable in conventional electric ranges or gas ranges. For example, the counter 22 may be fabricated from, among others, epoxies, plastics, polymides, etc. Another example would be glass which is suitably treated so as to withstand up to 550° F temperature. If required for purposes of electrostatic shielding and/or structural ehancement and/or decoration, the range counter 22 may include some metallic content. However, the inclusion of metallic material is necessarily limited to a small amount in order to permit almost all of the available power to be coupled from the induction coil 40 to the cooking vessel 38. In any case, the counter 22 according to the present invention is intended to be fabricated from a material or materials which: are substantially non-conductive electrically, are not magnetically permeable; are able to withstand temperatures of up to about 550° F. without suffering deleterious effects due to heating; and, are otherwise suitable for service as a range counter.

Figure 3:
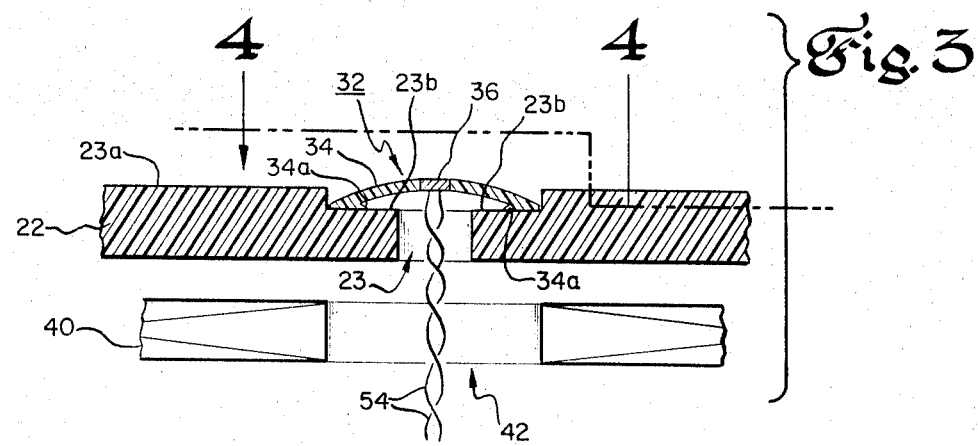
FIG. 3 is an enlarged fragmentary cross section view showing the range counter and temperature sensing unit which is comprised of a flexible silicon rubber diaphragm and temperature sensor.
Figure 4:
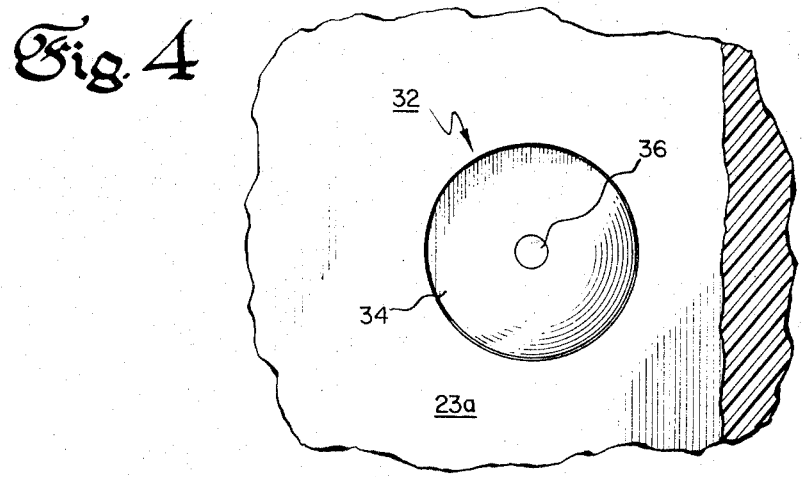
FIG. 4 is a fragmentary view taken along the section line 4–4' in FIG. 3.

Illustrated at FIGS. 3 and 4, is the range counter 22 which is provided with an opening designated, generally, by the reference number 23. The opening 23 is axially in line with the air core 42 of induction coil 40. The opening 23 extends completely through the counter 22 from one surface 23a (i.e., the top or working surface) of the counter to the other surface (i.e. the surface closest coil 40.) The opening 23 is so formed in the counter 22 as to provide near the working surface 23a an enlarged annular seat 23b.

Figure 5:
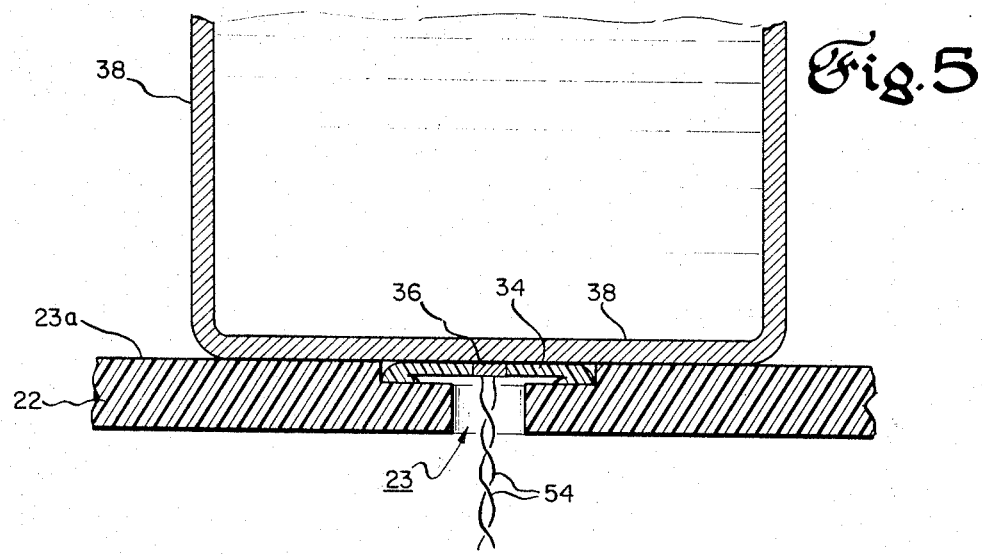
FIG. 5 is another enlarged fragmentary cross section view similar to that shown in FIG. 3, except that a cooking vessel is shown resting on the temperature sensing unit and flattening the flexible diaphragm thereof.

As shown in FIGS. 3 and 4, the temperature sensing unit 32 is comprised of a diaphragm 34 and a temperature sensor 36. Also, as shown, diaphragm 34 is a relatively thin, elastic, circular member. Being made of an elastomer, such as silicone rubber, the diaphragm 34 is easily preformed so as to have opposing concave and convex surfaces. As shown in FIG. 3, diaphragm 34 is disposed in the annular seat 23b provided in counter 22. The temperature sensor 36 may be one or more thermistor units; one thermistor unit being illustrated for purposes of simiplification. As stated hereinbefore a thermistor unit is comprised of thermistor material encapsulated in glass frit. In FIGS. 3 and 4 the thermistor unit 36 is partially embedded in a silicon rubber diaphragm 34 so that, as shown in FIG. 5, direct contact between an exposed portion of thermistor unit 36 and the surface of cooking vessel 38 may be made. In order to provide better seating, the diaphragm 34 may be formed with an annular flange 34a therein as indicated in FIG. 3. With the diaphragm 34 located in the annular seat 23b in counter 22, the annular flange 34 of the diaphragm is disposed in face-to-face contact with annular seat 23b. If desired, silicone rubber cement (not illustrated) may be used to bond the annular flange 34a of diaphragm 34 to the annular seat 23b of counter 22 thus securing diaphragm 34 to counter 22. As may be appreciated from the drawing figures, the diaphragm 34 closes the opening 23 in counter 22. Thus, there is provided an uninterrupted work surface on the top of counter 22, which includes the working surface 23a and the diaphragm 34 as well as the exposed portion of the thermistor 36.

FIGS. 3 and 5 illustrate the spring action of diaphragm 34. For example, in FIG. 3 diaphragm 34 having the partially exposed thermistor unit 36 embedded therein is shown in its unstressed state in that the vessel 38 is not resting thereon, as is the case in FIG. 5. As shown, the silicone rubber diaphragm 34 has been preformed so that it has opposing major surfaces which are relatively smooth and are somewhat concave and convex. The partially embedded thermistor unit 36 has an exposed surface thereof appearing on the convex surface of the silicone rubber diaphragm 34. When, as indicated at FIG. 5, a cooking vessel 38 containing food to be cooked is rested on the range counter 22 in contact with diaphragm 34, the convex surface of diaphragm 34 is flattened easily and the thermistor unit 36 directly contacts the bottom surface of the vessel 38. One advantage, among others, of the elastomeric (e.g., silicon rubber) diaphragm 34 is that it exerts a relatively small restoring force in opposition to the compression force exerted by the cooking vessel 38 thereupon. The restoring force exerted by diaphragm 34 is substantially smaller than the restoring force exerted by the spring arrangement hereinbefore described in connection with temperature sensing units employed in, for example, conventional electric ranges. The relatively small restoring force of diaphragm 34 provides, in effect, a highly compliant spring arrangement for the temperature sensing unit 32. This spring feature is especially well illustrated in FIG. 9; i.e., the spring feature of low restoring force and high compliance.

Figure 9:
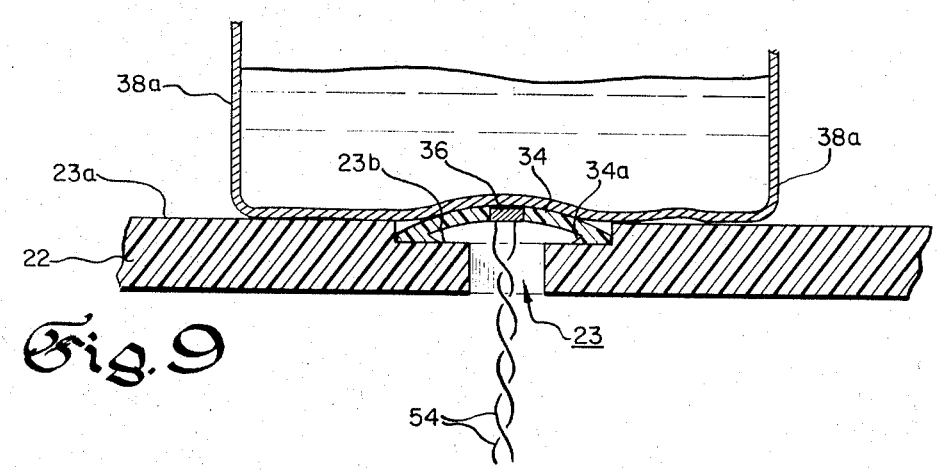
FIG. 9 is another enlarged fragmentary cross section view similar to that shown in FIG. 5, except that a relatively light weight cooking vessel with an irregular bottom surface is supported on the range counter and temperature sensing unit.

In FIG. 9 the food-containing vessel 38a is illustrated in the form of a pot made of relatively light weight, thin guage metal and, by design or accident, it has a highly irregular bottom surface. As indicated, the highly compliant diaphragm 34 yields easily under the relatively light weight of the food containing vessel and, moreover, diaphragm 34, being of a thin elastic material, contours itself rather well to the irregular surface presented by the vessel 38a. As indicated, the thermistor unit 36 embedded in the diaphragm 34 is in direct contact with the surface of the vessel or pot 38a, thermistor unit 36 being maintained in such contact by the relatively small restoring force exerted by diaphragm 34.

Advantageously, the temperature sensor 36 may be one or more thermistor units and since the diaphragm 34 is fabricated of an elastomer, such as silicone rubber, temperatures of about 550° F which may be experienced during the induction cooking process are easily withstood by these components and their materials without deleterious effects. Moreover, since diaphragm 34, sensor 36, and the conductors 54 are located along an axis passing through the air core 42 of the induction coil 40, these components are located at points of relatively low magnetic field intensity. Hence, only insignificant heating currents, if any, are induced in these components. Moreover, the conductors 54 are intertwined as illustrated for the purpose of cancelling such induced currents as may appear.

Figure 6:
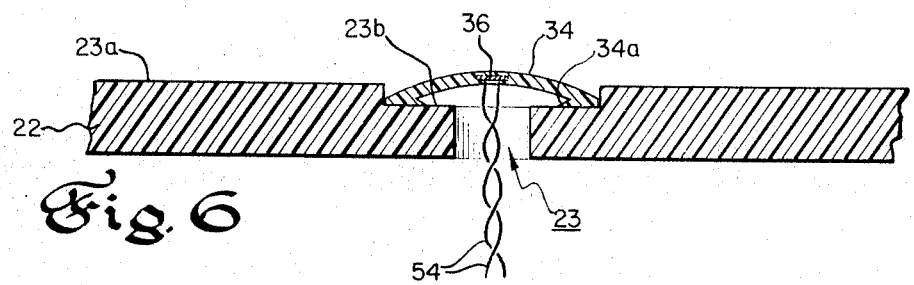
FIG. 6 is another enlarged fragmentary cross section view similar to that shown in FIG. 3, except that the temperature sensor is illustrated as being wholly embedded in the silicone rubber diaphragm.

In FIG. 6 there is illustrated an alternative to the construction and arrangement shown in FIGS. 2-5. In FIG. 6 the temperature sensor 36, or thermistor unit, is completely embedded in the silicon rubber diaphragm 34. Although the temperature sensor 36 will not actually contact the vessel 38, or the vessel 38a, when the diaphragm 34 containing it is in contact with the vessel as suggested at FIGS. 2, 5 and 9, the sensor 36 is coupled close enough to the vessel 38, or vessel 38a, to detect the actual temperature thereof very accurately.

Figure 7:
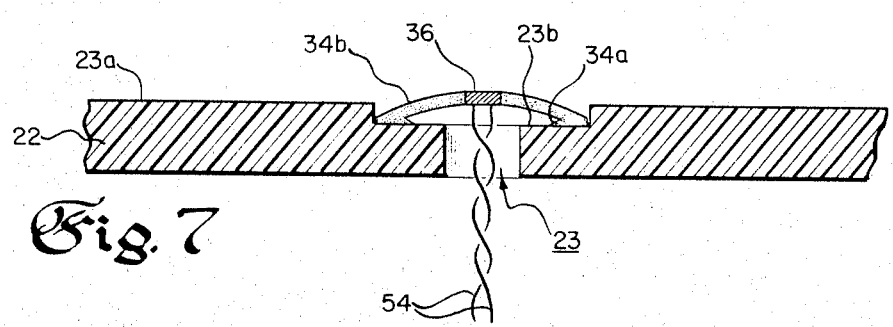
FIG. 7 is another enlarged fragmentary cross section view similar to that shown in FIG. 3, except that the diaphragm is made of silicone rubber permanent magnet material.

In FIG. 7 there is illustrated another modification of the temperature sensing unit 32. In this modification the diaphragm 34b is made of silicone rubber permanent magnet material. This material is sometimes known as plastic magnetic material. It is to be understood, however, that elastomers other than silicone rubber may be used as a matrix for the permanent magnet material. The diaphragm 34b has the temperature sensor 36 partially embedded therein in the same manner as herebefore described with respect to the temperature sensing unit shown in FIG. 3. However, the temperature sensor 36 could be completely embedded in the diaphragm 34b in a manner similar to that shown in FIG. 6. If the cooking vessel 38 is made of magnetically permeable material, the diaphragm 34b will make positive magnetic contact with the vessel and, in effect, hold onto the vessel by magnetic force. The exertion of such magnetic force will tend to: (1) cause the temperature sensor 36 to make a more positive coupling with the cooking vessel for temperature sensing purposes; and (2) aid the elastic permanent magnet diaphragm 34b to contour itself more closely to cooking vessels having an irregular bottom surface.

Figure 8:
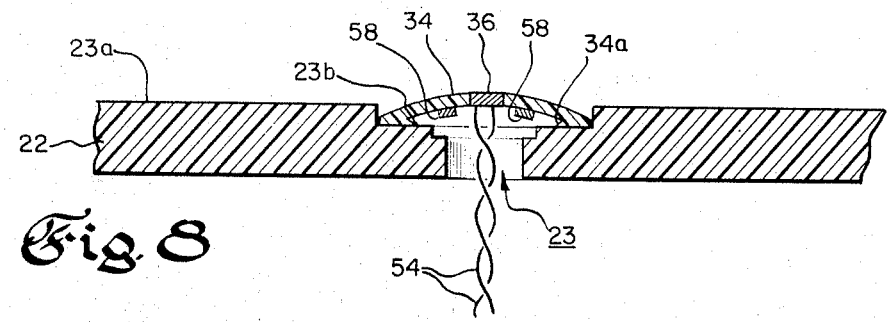
FIG. 8 is another enlarged fragmentary cross section view similar to that shown in FIG. 7, except that the diaphragm is made of silicone rubber and separate magnet means are attached to the diaphragm.

In FIG. 8 there is illustrated still another modification of the temperature sensing unit 32. In this modification a silicone rubber diaphragm 34 is employed together with separate permanent magnet means 58. The permanent magnet means 58 may be, for example, an annular permanent magnet bonded to the lower, or concave, surface of the diaphragm 34 as illustrated. The temperature sensor 36 may be partially embedded in diaphragm 34 or wholly embedded as hereinbefore described with reference to FIGS. 6 and 3, respectively. Again, in the event that the cooking vessel 38 is made of magnetically permeable material, the magnetic force exerted by the permanent magnet means 58 will tend to cause the sensor 36 to make better or more positive coupling with the cooking vessel 38 and also enable the diaphragm 34 to contour itself more closely to a cooking vessel having an irregularly shaped bottom surface.

Although the invention has been described and illustrated by way of specific embodiments thereof, it is to be understood that many changes in details of construction and in the combination and arrangement of parts and components may be made without departing from the spirit and scope of the invention as it is hereinafter claimed.

What is claimed is:

1. An induction cooking appliance, for heating a vessel which has at least one portion in which electric current may be induced in order to heat said one portion of said vessel, comprising: vessel supporting means for supporting said vessel, said vessel supporting means being of a material in which no substantial amount of current is induced when said vessel supporting means is subjected to a changing magnetic field, said vessel supporting means having a surface on which said vessel is supportable, said vessel supporting means including an opening therein which communicates with said surface; an induction coil energizable for generating a changing magnetic field within which said one portion of said vessel is located whereby electric current is inducted in said one portion of said vessel thereby heating said one portion; an electric power source; a power conversion circuit coupled with said power source and said induction coil, said conversion circuit converting the power of said source to electric power of at least ultrasonic frequency and energizing said induction coil with the electric power of said at least untrasonic frequency; and, a temperature sensing unit comprising spring means and temperature sensing means supported by said spring means, said spring means and supported temperature sensing means being located in said opening in said vessel supporting means, at least said spring means forming a closure for said opening in said vessel supporting means, said closure together with said surface of said vessel supporting means providing a substantially uninterrupted working surface on said vessel supporting means, said spring means having a relatively low restoring force and being compressible by said vessel as said vessel contacts said spring means when said vessel is being supported on said surface of said vessel supporting means, said temperature sensing means supported by said spring means being proximate said at least one portion of said vessel as said vessel contacts said spring means when said vessel is being supported on the surface of said vessel supporting means whereby said temperature sensing means senses the temperature of said at least one portion of said vessel, said spring means and said temperature sensing means being of materials in which no substantial amount of current is induced when said spring means and said temperature sensing means are subjected to a changing magnetic field, said spring means being a diaphragm of elastic permanent magnet material which forms said closure for said opening in said vessel supporting means and which exerts a relatively low restoring force when compressed by said vessel and which conforms to the contour of that part of the vessel which is in compressive contact with said diaphragm, said diaphragm exerting an attractive magnetic force on said part of said vessel which is in compressive contact with said diaphragm when said part is of magnetically permeable material.

2. An induction cooking appliance, for heating a vessel which has at least one portion in which electric current may be induced in order to heat said one portion of said vessel, comprising: vessel supporting means for supporting said vessel, said vessel supporting means being of a material in which no substantial amount of current is induced when said vessel supporting means is subjected to a changing magnetic field, said vessel supporting means having a surface on which said vessel is supportable, said vessel supporting means including an opening therein which communicates with said surface; an induction coil energizable for generating a changing magnetic field within which said one portion of said vessel is located whereby electric current is inducted in said one portion of said vessel thereby heating said one portion; an electric power source; a power conversion circuit coupled with said power source and said induction coil, said conversion circuit converting the power of said source to electric power of at least ultrasonic frequency and energizing said induction coil with the electric power of said at least ultrasonic frequency; and a temperature sensing unit comprising spring means and temperature sensing means supported by said spring means, said spring means and supported temperature sensing means being located in said opening in said vessel supporting means, at least said spring means forming a closure for said opening in said vessel supporting means, said closure together with said surface of said vessel supporting means providing a substantially uninterrupted working surface on said vessel supporting means, said spring means having a relatively low restoring force and being compressible by said vessel as said vessel contacts said spring means when said vessel is being supported on said surface of said vessel supporting means, said temperature sensing means supported by said spring means being proximate said at least one portion of said vessel as said vessel contacts said spring means when said vessel is being supported on the surface of said vessel supporting means whereby said temperature sensing means senses the temperature of said at least one portion of said vessel, said spring means and said temperature sensing means being of materials in which no substantial amount of current is induced when said spring means and said temperature sensing means are subjected to a changing magnetic field, said spring means being comprised of an elastic diaphragm and separate permanent magnet means supported by said diaphragm, said diaphragm and permanent magnet means forming said closure for said opening in said vessel supporting means, said diaphragm exerting a relatively low restoring force when compressed by said vessel, said diaphragm conforming to the contour of that part of the vessel which is in compressive contact with said diaphragm, said permanent magnet means exerting an attractive magnetic force on said part of said vessel which is in compressive contact with said diaphragm when said part is of magnetically permeable material.

* * * * *